United States Patent [19]

Ryan

[11] Patent Number: 4,784,174

[45] Date of Patent: Nov. 15, 1988

[54] DRAIN AND SHUTOFF VALVE ASSEMBLY

[75] Inventor: William E. Ryan, Richfield, Wis.

[73] Assignee: A. O. Smith Corporation, Milwaukee, Wis.

[21] Appl. No.: 80,752

[22] Filed: Jul. 29, 1987

[51] Int. Cl.[4] .............................................. F16L 55/18
[52] U.S. Cl. ...................... 137/15; 251/143; 251/144; 251/218
[58] Field of Search ...................... 251/144, 143, 218; 137/15, 315

[56] References Cited

U.S. PATENT DOCUMENTS

| | | | |
|---|---|---|---|
| 1,786,750 | 12/1930 | Hasselquist et al. | 251/144 |
| 2,734,713 | 2/1956 | Webster | 251/145 |
| 2,904,071 | 9/1959 | Stein | 137/596 |
| 3,070,117 | 12/1962 | Callahan et al. | 251/218 |
| 3,370,827 | 2/1968 | Stehlin | 251/144 |
| 3,727,637 | 4/1973 | Barkelew | 137/467 |
| 3,918,605 | 11/1975 | Butler | 220/63 R |
| 4,537,329 | 8/1985 | Norton | 220/465 |
| 4,650,158 | 3/1987 | Roberts | 251/144 |

Primary Examiner—A. Michael Chambers
Attorney, Agent, or Firm—Andrus, Sceales, Starke & Sawall

[57] ABSTRACT

A drain and shutoff valve assembly for a water pressure tank. The lower end of the tank is provided with a non-circular opening within which the drain and shutoff valve assembly is mounted. The assembly includes a plastic body having an outer non-circular section, which is received within the opening in the tank, and an inner section having a larger cross-sectional area than the outer section. The valve body is provided with a drain passage which can be opened and closed by a needle-type valve. An annular seal is disposed between the inner section of the body and the inner surface of the tank, while a retaining clip is engaged with a groove in the outer section of the body and bears against the outer surface of the tank to hold the valve body in position within the tank opening.

17 Claims, 1 Drawing Sheet

U.S. Patent   Nov. 15, 1988   4,784,174
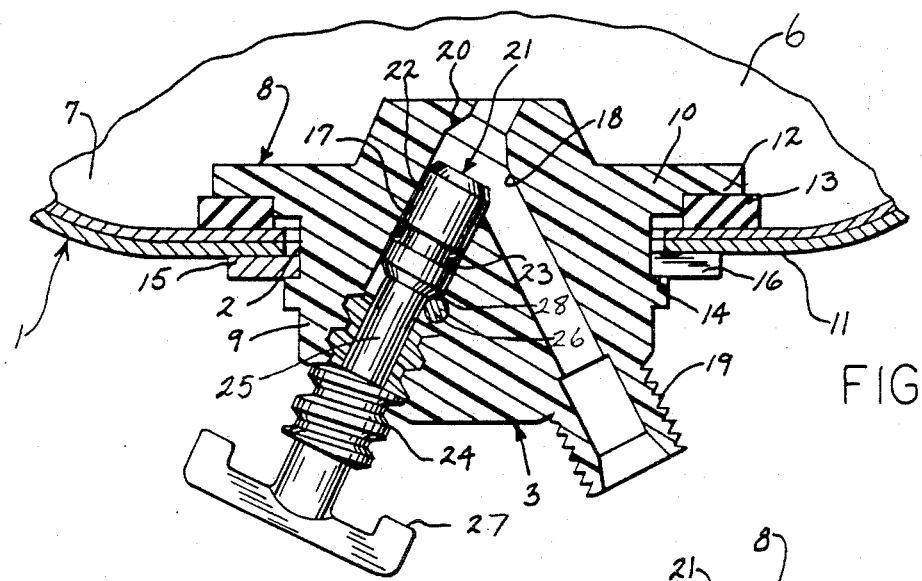
FIG 1
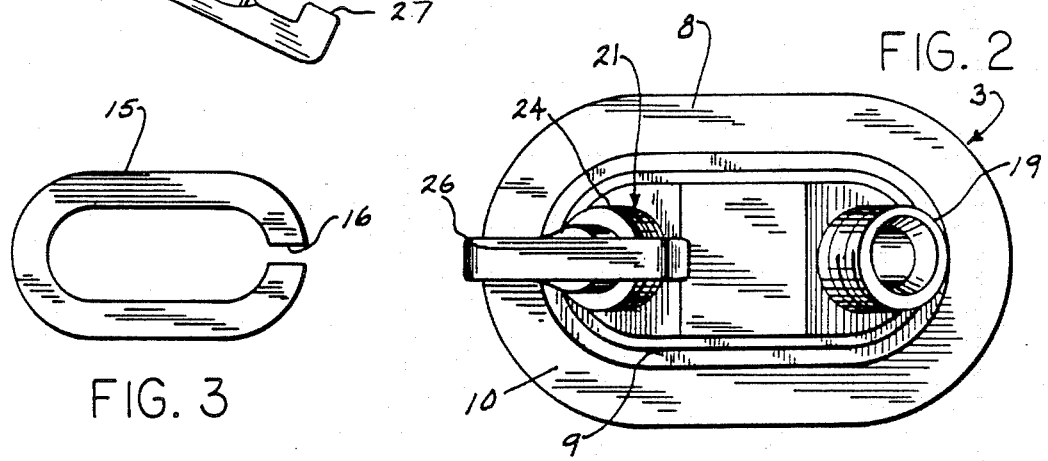
FIG. 2
FIG. 3
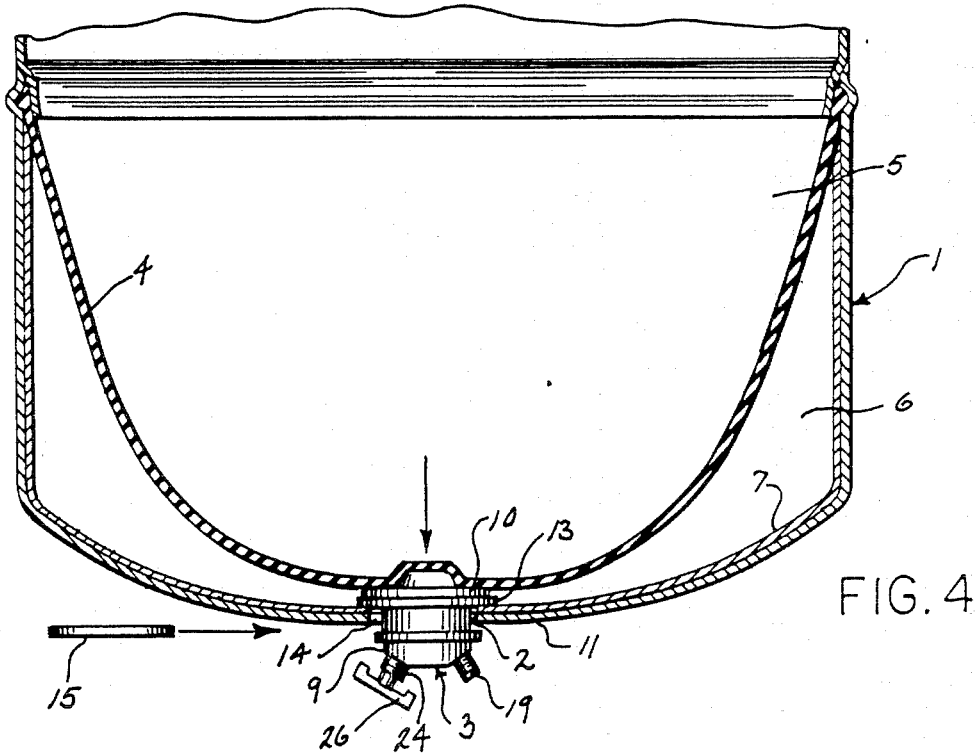
FIG. 4

DRAIN AND SHUTOFF VALVE ASSEMBLY

BACKGROUND OF THE INVENTION

A water pressure tank is used in a water supply system to store a volume of water under pressure. Without the pressure tank, the pump would operate each time water was drawn from a faucet or outlet. With the conventional water pressure tank, water is pumped into the lower end of the tank, compressing air trapped in the upper head of the tank. The pressure exerted by the compressed air will then enable the water to be distributed from the pressure tank through the piping system of the building Over a period of time, the entrapped air in the head of the tank will gradually dissolve in the water, reducing the air volume and resulting in what is termed a "waterlogged" tank. To cure the waterlogged condition, the air head must be restored either by introducing compressed air into the upper end of the tank or draining the tank and subsequently refilling with water.

More recently water pressure tanks have been constructed to separate the water from the air head through use of a bladder or diaphragm, as disclosed in U.S. Pat. No. 4,474,215. The use of a diaphragm prevents the air head from dissolving in the water and thereby prevents a "waterlogged" condition.

The conventional water pressure tank has a water outlet in the bottom, which is connected to the water piping system, and a valve is associated with the outlet to open or close the same. Under normal operating conditions, the valve will be in an open conditon and will only be closed for repair or maintenance of the tank or water system.

SUMMARY OF THE INVENTION

The invention is directed to an improved drain and shutoff valve assembly for a water pressure tank. In accordance with the invention, the lower end of the water pressure tank is formed with a non-circular opening, preferably oval in configuration, within which the drain and shutoff assembly is mounted. The drain and shutoff valve assembly is composed of a plastic body having a non-circular outer section, which is received within the opening in the tank, and an inner section having a larger cross sectional area than the outer section which is disposed in engagement with the inner surface of the tank bordering the opening.

The body is formed with a pair of passages, the first of which communicates with the tank, while the second communicates with the exterior and intersects the first passage at an acute angle. A needle valve is threaded in the outer end of the first passage and acts to open or close the second passage to thereby control the flow of water into and out of the tank.

The outer periphery of the inner section of the body is formed with an annular recess which receives a gasket or sealing member that engages the inner surface of the tank bordering the opening to seal the opening.

To retain the body within the opening, a flexible retaining clip is engaged with a groove formed in the periphery of the outer section of the body and is in contact with the outer surface of the tank bordering the opening.

The complementary non-circular configurations of the tank opening and the outer section of the valve body enable the tank to be rotated through rotation of the valve body. During manufacture of the pressure tank, the outer surface of the tank is painted and in the painting operation, the tank is rotated by rotation of the valve body.

The fitting of the invention is easy to assemble and disassemble to the tank and no threaded connections are required.

The sealing member or gasket not only prevents leakage of the water from the tank, but also prevents potential contamination of the water in the tank. In this regard, the inner surface of the tank is normally coated with a corrosion resistant material, such as glass or porcelain enamel. However, the edge bordering the tank opening is normally not glass coated and could be subject to corrosion. Thus, the sealing member prevents contamination of the water with any products of corrosion which could result from corrosion of the uncoated edge.

The drain and shutoff valve assembly of the invention has a compact design with a minimum profile, providing the tank with a more attractive appearance.

The needle valve provides a positive shutoff for water flow through the outlet passage, and a provision is made to prevent the complete displacement of the valve from the assembly or fitting, so that there is no possibility of water draining through the valve opening.

Other objects and advantages will appear in the course of the following description.

DESCRIPTION OF THE DRAWINGS

The drawings illustrate the best mode presently contemplated of carrying out the invention.

In the drawings:

FIG. 1 is a vertical section of the lower portion of a water pressure tank incorporating the drain and shutoff valve assembly of the invention;

FIG. 2 of a bottom view of the assembly;

FIG. 3 is an elevational view of the retaining clip; and

FIG. 4 is a vertical section of the tank showing the manner of installing the valve assembly in the tank opening.

DESCRIPTION OF THE ILLUSTRATED EMBODIMENT

FIG. 1 illustrates a water pressure tank 1 having an opening 2 within which a drain and shutoff valve assembly 3 is mounted. A flexible diaphragm 4 extends across tank 1 and can be connected to the tank in the manner as described in U.S. Pat. No. 4,474,215. Diaphragm 4 divides the tank into an upper air chamber 5 and a lower water chamber 6. The inner surface of tank 1 may be coated with a corrosion resistant coating 7, such as glass porcelain enamel or plastic.

Pressure tank 1 operates in a conventional manner. Water is pumped into the tank 1 through assembly 3, causing diaphragm 4 to flex upwardly, and when a pre-determined pressure is achieved, operation of the pump is discontinued. When a faucet is opened in the water system, water will be discharged from tank 1 through assembly 3 and when the pressure in the tank decreases to a minimum level, the pump will be restarted to deliver additional water to the tank.

The drain and shutoff fitting 3 includes a body 8, preferably formed of molded plastic. Body 8 is composed of a non-circular outer section 9 which, as shown in the drawings is oval in configuration, and an inner section 10 which, as illustrated, is also generally oval in configuration and has a larger cross sectional area than outer section 9. Outer section 9 extends through an opening 2 in the flat lower portion 11 of the tank and the opening has a cross section similar to the non-circular cross section of section 9. In installations where the entire lower portion of tank 1 is curved, the inner section 10 is preferably formed with a circular configuration to conform to the curvature.

To seal body 8 to tank 1, the periphery of inner section 10 of the body is formed with a recess 12 which receives a resilient seal or gasket 13, such as an O-ring. Seal 13 bears against the inner surface of tank 1, as shown in FIG. 1.

In order to secure body 8 within opening 2, the periphery of outer section 9 is formed with a groove 14 and a generally oval retaining clip 15, formed of flexible material, is disposed within groove 14 and bears against the outer surface of tank 1, as shown in FIG. 1. Clip 15 is best illustrated in FIG. 3, and is provided with a slit end 16. By flexing the arms of the clip outwardly, the slit end 16 can be inserted around the outer section 9 and into groove 14 to maintain the body 8 in position within opening 2.

Body 8 is formed with a pair of passages 17 and 18. Passage 17 communicates with the interior of tank 1, while passage 18 communicates with the exterior and intersects passage 17 at an acute angle, as shown in FIG. 1. Body 8 is formed with a threaded boss 19 which surrounds the outer end of passage 18 and can be connected to the water piping system.

A valve seat 20 is formed in passage 17 inwardly of the junction of passages 17 and 18 and a valve 21, which is movable in passage 17 is adapted to seat against seat 20 to close the drain passage.

The inner end 22 of valve 21 is provided with a circumferential groove which receives an O-ring 23 that seals against the walls of passage 17, while the outer end of valve 21 is provided with a thread 24 which is engaged with the internal threaded end of passage 17. Valve 21 is constructed so that the O-ring seal 23 will always be in sealing relation with the walls of passage 17, regardless of whether the valve 21 is open or closed, to prevent the flow of water through passage 17 to the exterior.

A provision is also made to prevent complete displacement of the valve 21 from passage 17 to thereby prevent any possibility of water escaping through passage 17. In this regard, the central portion 25 of valve 21 has a reduced diameter and a dowel pin 26 extends through an opening in body 8 that intersects passage 17. As valve 21 is unthreaded by rotating handle 27, the enlarged inner end 22 of the valve will engage pin 26 to prevent complete displacement of the valve from passage 17. When valve 21 is in its fully open position, the seal 23 will be in sealing engagement with the walls bordering passage 17, so that there will be no leakage of water through the passage 17.

To prevent possible damage to valve 21 due to excessive torque in the event the valve is rotated through use of a wrench or pliers on handle 27, a "slip-thread" construction is incorporated. More specifically, valve 21 and body 8 are molded such that when the valve is unthreaded to the point where the shoulder 28 on end 22 contacts pin 26, there is a minimal amount of thread engagement between the valve 21 and body 8. After contacting pin 26, continued rotation of valve 21 in an effort to further open the valve, will disengage the threads so that the valve 21 will then freely rotate or slip. To close the valve, the valve is rotated clockwise and the threads engage in the normal manner.

To install the assembly of the invention, the outer section 9 is inserted through opening 2 with seal 13 in engagement with the inner surface of tank 1 before diaphragm 4 is installed in the tank. Pressure is then applied to the inner end of the inner section 10 to compress seal 13 and enable the clip 15 to be inserted within groove 14. It has been found that a convenient manner of applying pressure to the body 8 to compress the seal is through action of the diaphragm 4. In this regard, after the inner section 9 has been inserted through the opening 2, diaphragm 4 is installed in the tank and the upper chamber 5 is pressurized, causing the diaphragm to flex downwardly into engagement with the upper end of body 8, thereby compressing the seal 13, as shown in FIG. 4. In practice a pressure of about 40 psi can be employed in chamber 5 to compress seal 13 to enable the retaining clip 15 to be inserted within groove 14.

As shown in the drawings, the fitting or assembly 3 is attached to a generally flat area of the bottom of tank 1. However, in other installations the fitting can be attached to a curved or spherical portion of the tank. In this latter case, the installation of the retaining clip will act to deform the steel tank to a generally flat condition in the area of the fitting and the deflection of the tank wall creates an additional force that aids in compressing the O-ring seal. The tendency of the metal tank wall to spring back to its original condition will act to compensate for any creep or shrinkage in the material of the seal or in the fitting.

The non-circular configuration of outer section 9 and opening 11 prevents relative rotation between the fitting and the tank, which aids in tank manufacture. More specifically, tank 1 is normally painted after assembly of fitting 3 and before installation of retaining clip 15. and in the painting operation the tank is suspended by the fitting 3. Rotation of the fitting will cause corresponding rotation of the tank during the painting operation.

The fitting of the invention can be readily assembled and disassembled to the tank without threaded connections and without the need of any special tools.

The molded plastic body is corrosion resistant and has a compact design which provides a more attractive appearance for the water pressure tank.

Valve 21 provides a positive opening and closing of the drain passage and includes a sealing mechanism which prevents any leakage of water through the valve opening. Further, complete displacement of the valve from the valve opening is prevented to thereby eliminate the possibility of water being discharged throught the valve opening.

While the above description has shown the invention as used with a water pressure tank, it is contemplated that the invention can also be used with other types of liquid pressure tanks.

Various modes of carrying out the invention are contemplated as being within the scope of the following claims particularly pointing out and distinctly claiming the subject matter which is regarded as the invention.

I claim:

1. In combination, a tank to contain a liquid and having a non-circular opening therein, a fitting mounted in the opening, said fitting including a body extending through said opening and having an outer section with a noncircular cross section disposed within said opening and having an inner section with a larger cross sectional area than said outer section and disposed in engagment with the inner surface of said tank, said body having passage means providing communication between the interior of said tank and the exterior, manually operated valve means for opening and closing said passage means, an annular compressible sealing means disposed between said inner section and the inner surface of the tank, and retaining means connected to said outer section for retaining said body within said opening, the mating non-circular configuration of said outer section and said opening enabling said tank to be rotated ring fabrication in accordance with rotation of said fitting.

2. The combination of claim 1, wherein sid retaining means comprises clip means, and said outer section has a peripoheral groove, said clip means disposed in said groove, engagement of said clip means with said groove acting to compress said sealing means.

3. The combination of claim 2, wherein said clip means comprises a flexible generally U-shaped clip having an open end.

4. The combination of claim 2, wherein said groove extends continuously around the periphery of said outer section.

5. The combination of claim 1, wherein said passage means includes a first passage having an inner end communicating with the interior of said tank and having an open outer end communicating with the exterior of the tank, said passage means also including a second passage having an inner end intersecting said first passage and having an outer end communicating with the exterior of the tank, said valve means including a valve seat disposed in said first passage between the inner end of said first passage and the intersection of said first and second passages, said valve means including a valve member mounted for axial movement in the outer portion of said first passage and disposed to engage said seat to prevent flow of liquid from the tank through said first and second passages.

6. The combination of claim 5, and including second sealing means for providing a seal between said valve member and said outer portion of said first passage to prevent flow of liquid through said outer portion of said first passage when said valve member is disengaged from said valve seat.

7. The combination of claim 1, wherein said tank has a generally flat area bordering said opening.

8. The combination of claim 7, wherein said inner section is generally circular in cross-sectional configuration.

9. The combination of claim 1, wherein said outer section is generally oval in cross-sectional configuration.

10. In combination, a tank to contain a liquid and having an opening therein, a fitting mounted in said opening, passage means in said fitting providing communication between the interior of said tank and the exterior, manually operated valve means for opening and closing said passage means, said passage means includes a first passage having an inner end communicating with the interior of said tank and having an open outer end communicating with the exterior of the tank, said passage means also including a second passage having an inner end intersecting said first passage and having an outer end communicating with the exterior of the tank, said valve means including a valve seat disposed in said first passage between the inner end of said first passage and the intersection of said first and second passages, said valve means including a valve member mounted for axial movement in the outer portion os said first passage and disposed to engage said seat to prevent flow of liquid from the tank to the exterior through said first and second passages.

11. The combination of claim 10, and including sealing means for providing a seal between said valve member and the outer portion of said first passage to prevent flow of liquid through said outer portion of said first passage when said valve member is disengaged from said valve seat.

12. The combination of claim 10, and including means associated with said fitting for preventing complete displacement of said valve member from said first passage, said means for preventing complete displacement comprising an abutment on said valve member and a pin disposed in said first passage, said abutment and said pin arranged so that said abutment will engage said pin as said valve member is unthreaded to prevent complete displacement of said valve member from said first passage.

13. The combination of claim 12, wherein said pin extends transversely of the axis of said passage and is disposed within a longitudinally extending circumferential recess in said valve member, the longitudinal dimension of said recess being substantially greater than the diameter of said pin so that said valve member can be moved longitudinally relative to said pin.

14. In combination, a tank to contain a liquid and having an opening therein, a fitting mounted in said opening, passage means in said fitting providing communication between the interior of said tank and the exterior, said passage means defining a valve seat and having a threaded portion spaced from said valve seat, rotatable valve means having a valve member disposed to engage said seat to close said passage means, said valve means having a threaded portion disposed to engage the threaded portion of said passage means to provide a threaded connection, and stop means disposed in said passage means and disposed to be engaged by an abutment on said valve means for preventing complete displacement of said valve means from said passage means as said valve means is unthreaded from said passage means, said threaded connection being constructed and arranged such that continued rotation of said valve means after engagement of said stop means by said abutment will disengage said threaded connection to permit said valve means to freely rotate relative to said passage means.

15. A method of installing a drain and shut-off valve fitting in a water pressure tank, comprising the steps of forming a water pressure tank with an opening in the lower end thereof, forming a fitting having an outer section shaped to be received within said opening and an inner section with a larger cross-sectional area than said outer section, inserting said outer section in said opening with said inner section located in said tank, positioning an annular sealing member between said inner section and the inner surface of the tank bordering the opening, assembling a flexible diaphragm transversely across the tank to divide the tank into an upper gas chamber and a lower liquid chamber, pressurizing the gas chamber to force the diaphragm into engagement with said inner section of said fitting to thereby compress said sealing member against said inner surface, and engaging a retaining member with said outer section adjacent the outer surface of said tank while said gas chamber is pressurized to thereby retain said fitting within said opening.

16. The method of claim 15, and including the step of forming a groove in the outer section of said fitting, said step of engaging a retaining member comprising inserting a clip into said groove to retain the fitting within said opening.

17. The method of claim 16, and including the steps of forming the portion of the tank bordering the opening with an inwardly concave configuration, and deforming said portion to a generally flat condition as said clip is inserted within said groove.

* * * * *

UNITED STATES PATENT AND TRADEMARK OFFICE
CERTIFICATE OF CORRECTION

PATENT NO. : 4,784,174
DATED : November 15, 1988
INVENTOR(S) : William E. Ryan

It is certified that error appears in the above-identified patent and that said Letters Patent is hereby corrected as shown below:

IN THE TITLE: After "ASSEMBLY" insert ---FOR A PRESSURE TANK---;

IN THE CLAIMS: Col. 5, line 1, delete "engagment" and substitute therefor ---engagement---; Col. 5, line 11, delete "ring" and substitute therefor ---during---; Col. 5, line 13, delete "sid" and substitute therefor ---said---; Col. 5, line 15, delete "peripoheral" and substitute therefor ---peripheral---; Col. 6, line 1, delete "os" and substitute therefor ---of---

Signed and Sealed this

Nineteenth Day of December, 1989

*Attest:*

JEFFREY M. SAMUELS

*Attesting Officer*     *Acting Commissioner of Patents and Trademarks*